(12) United States Patent
Smith et al.

(10) Patent No.: US 9,876,768 B2
(45) Date of Patent: Jan. 23, 2018

(54) SYSTEM, APPARATUS AND METHOD FOR SECURE COORDINATION OF A RENDEZVOUS POINT FOR DISTRIBUTED DEVICES USING ENTROPY MULTIPLEXING

(71) Applicant: Intel Corporation, Santa Clara, CA (US)

(72) Inventors: Ned M. Smith, Beaverton, OR (US); Mats G. Agerstam, Portland, OR (US); Narasimham Gadiraju, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 162 days.

(21) Appl. No.: 14/865,576

(22) Filed: Sep. 25, 2015

(65) Prior Publication Data
US 2016/0366106 A1    Dec. 15, 2016

Related U.S. Application Data

(60) Provisional application No. 62/172,896, filed on Jun. 9, 2015.

(51) Int. Cl.
*H04L 29/06* (2006.01)
*H04L 29/08* (2006.01)
*H04W 12/06* (2009.01)

(52) U.S. Cl.
CPC ...... *H04L 63/0428* (2013.01); *H04L 67/1002* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 2004/0125811 A1* | 7/2004 | Raad | H04W 74/08 370/400 |
| 2004/0128387 A1* | 7/2004 | Chin | H04W 74/08 709/227 |

(Continued)

OTHER PUBLICATIONS

Porras et al., An Analysis of Conficker's Logic and Rendezvous Points. Computer Science Laboratory SRI International [online], Mar. 19, 2009 [retrieved on May 12, 2017]. Retrieved from the Internet: < URL: http: // mtc. sri. com/ conficker >.*

(Continued)

*Primary Examiner* — Malcolm Cribbs
(74) *Attorney, Agent, or Firm* — Trop, Pruner & Hu, P.C.

(57) ABSTRACT

In one embodiment, a method includes: receiving, in a first device of a first segment of a first network, a root seed from a second device; generating a pseudo-random seed tree using the root seed; according to a predetermined schedule, accessing at a first time a random number at a level of the pseudo-random seed tree associated with the first time; generating a rendezvous point record to enable communication with a third device in a second segment of the first network, the rendezvous point record including a rendezvous point name based on the random number; and encrypting and sending a message to the third device via an exchange server identified using the rendezvous point record, where the rendezvous point record does not include connection metadata and the exchange server has an anonymous network location.

25 Claims, 5 Drawing Sheets

(56) References Cited

U.S. PATENT DOCUMENTS

| | | | | |
|---|---|---|---|---|
| 2013/0132502 | A1* | 5/2013 | Stacey | H04W 56/0015 709/208 |
| 2015/0281344 | A1* | 10/2015 | Grootwassink | H04L 67/104 713/168 |
| 2015/0351068 | A1* | 12/2015 | Deleeuw | H04W 64/00 455/456.1 |
| 2016/0012252 | A1* | 1/2016 | Deleeuw | G06F 21/6254 726/26 |
| 2016/0021043 | A1* | 1/2016 | Modi | H04L 51/14 709/206 |
| 2016/0087792 | A1* | 3/2016 | Smith | H04L 9/085 380/278 |
| 2016/0182228 | A1* | 6/2016 | Smith | H04L 9/0841 713/171 |
| 2016/0371685 | A1* | 12/2016 | Smith | G06Q 20/40 |

OTHER PUBLICATIONS

Estrin et al., A Dynamic Bootstrap Mechanism for Rendezvous-based Multicast Routing. Computer Science Department/Information Science Institute, University of Southern California [online], 1999 [retrieved on May 12, 2017]. Retrieved from the internet: < URL: http: // ieeexplore.ieee. org/ abstract/ document/ 751664/ >.*

Wikipedia, "OSI Model", https://en.wikipedia.org/wiki/OSI_model#Layer_4:_Transport_Layer, Jun. 8, 2015, 7 pages.

Wikipedia, "Key Management", https://en.wikipedia.org/wiki/Key_management, May 19, 2015, 5 pages.

Wikipedia, "Publish—Subscribe Pattern", https://en.wikipedia.org/wiki/Publish%E2%80%93subscribe_pattern, Mar. 18, 2015, 4 pages.

Wikipedia, "Data Distribution Service", https://en.wikipedia.org/wiki/Data_Distribution_Service, May 21, 2015, 5 pages.

Wikipedia, "Kerberos (Protocol)", https://en.wikipedia.org/wiki/Kerberos_%28protocol%29, May 7, 2015, 6 pages.

Stackexchange, "Cryptography", http://crypto.stackexchange.com/questions/3682/how-can-the-diffie-hellman-key-exchange-be-extended-to-three-parties, Aug. 30, 2012, 1 page.

Wikipedia, "XMPP", https://en.wikipedia.org/wiki/XMPP, May 22, 2015, 7 pages.

IBM Mobilefirst, "Pairwise and Group Keys", http://etutorials.org/Networking/802.11+security.+wi-fi+protected+access+and+802.11i/Part+II+The+Design+of+Wi-Fi+Security/Chapter+10.+WPA+and+RSN+Key+Hierarchy/Pairwise+and+Group+Keys/, accessed Sep. 3, 2015, 6 pages.

Hardjono, et al., "Fluffy: Simplified Key Exchange for Constrained Environments", draft-hardjono-ace-fluffy-00, Mar. 23, 2015, 24 pages, Intel Corporation.

openinterconnect.org, "Open Interconnect Consortium: An Overview to Connect Devices Everywhere", http://openinterconnect.org/wp-content/uploads/2015/07/Open-Interconnect-ConsortiumOverview_Final-.pdf, Jul. 2015, 7 pages.

openinterconnect.org, "The Open Interconnect Consortium and IoTivity", http://openinterconnect.org/wp-content/uploads/2015/07/OIC-IoTivity_White-Paper_Final1.pdf, Jul. 2015, 5 pages.

openinterconnect.org, "Cloud-Native Architecture and the Internet of Things", http://openinterconnect.org/wp-content/uploads/2015/07/Cloud-Native-IoT-White-Paper_white_centered_Final.pdf, Jul. 2015, 3 pages.

openinterconnect.org, "Freedom to Implement: OIC and IoTivity", http://openinterconnect.org/wp-content/uploads/2015/07/OIC-IoT-Standards-and-Implementation_White-Paper_Final.pdf, Jul. 2015, 2 pages.

U.S. Appl. No. 14/863,043, filed Sep. 23, 2015, entitled "System, Apparatus and Method for Group Key Distribution on for a Network" by Ned M. Smith.

U.S. Appl. No. 14/864,940, filed Sep. 25, 2015, entitled "System, Apparatus and Method for Secure Network Bridging Using a Rendezvous Service and Multiple Key Distribution Servers" by Ned M. Smith, et al.

U.S. Appl. No. 14/864,957, filed Sep. 25, 2015, entitled "System, Apparatus and Method for Managing Lifecycle of Secure Publish-Subscribe System" by Ned M. Smith, et al.

Wikipedia, "https://en.wikipedia.org/w/index.php?title=Shamir%27s_Secret_Sharing&oldid=662331542" May 14, 2015, 5 pages.

U.S. Appl. No. 14/865,191, filed Sep. 25, 2015, entitled "System, Apparatus and Method for Multi-Owner Transfer of Ownership of a Device" by Jesse Walker, et al.

U.S. Appl. No. 14/865,198, filed Sep. 25, 2015, entitled "System, Apparatus and Method for Transferring Ownership of a Device From Manufacturer to User Using an Embedded Resource" by Ned M. Smith, et al.

U.S. Appl. No. 14/856,857, filed Sep. 17, 2015, entitled "System, Apparatus and Method for Access Control List Processing in a Constrained Environment" by Ned M. Smith, et al.

U.S. Appl. No. 14/859,572, filed Sep. 21, 2015, entitled "System, Apparatus and Method for Privacy Preserving Distributed Attestation for Devices" by Ned M. Smith, et al.

U.S. Appl. No. 14/863,496, filed Sep. 24, 2015, entitled "System, Apparatus and Method for Stateful Application of Control Data in a Device" by Nathan Heldt-Sheller, et al.

U.S. Appl. No. 14/998,275, filed Dec. 26, 2015, entitled "System, Apparatus and Method for Auto-Optimization of Access Control Policy and Key Management in a Network Authoring Tool" by Ned M. Smith, et al.

U.S. Appl. No. 15/045,676, filed Feb. 17, 2016, entitled "System, Apparatus and Method for Security Interoperability Path Analysis in an Internet of Things (IOT) Network" by Ned M. Smith, et al.

U.S. Appl. No. 62/172,962, filed Jun. 9, 2015, entitled "Providing Protected content in an IoT Network" by Ned M. Smith, et al.

U.S. Appl. No. 14/968,125, filed Dec. 14, 2015, entitled "A Self-Configuring Key Management System for an Internet of Things Network" by Ned M. Smith.

U.S. Appl. No. 14/757,750, filed Dec. 23, 2015, entitled "System, Apparatus and Method for Optimizing Symmetric Key Cache Using Tickets Issued by a Certificate Status Check Service Provider" by Ned M. Smith, et al.

U.S. Appl. No. 14/976,165, filed Dec. 21, 2015, entitled "System, Apparatus and Method for Migrating a Device Having a Platform Group" by Ned M. Smith, et al.

U.S. Appl. No. 14/977,742, filed Dec. 22, 2015, entitled "System, Apparatus and Method for Safety State Management of Internet Things (IoT) Devices" by Ned M. Smith, et al.

Wikipedia, "Tor", https://en.wikipedia.org/wiki/Tor_%28anonymity_network%29 , Jun. 4, 2015, 14 pages.

Networkworld, "A guide to the confusing Internet of Things standards world", http://www.networkworld.com/article/2456421/internet-of-things/a-guide-to-the-confusing-internet-of-things-standards-world.html, Jul. 21, 2014, 7 pages.

International Searching Authority, "Notification of Transmittal of the Written Opinion of the International Searching Authority," dated Aug. 8, 2016 in International application No. PCT/US2016/033820.

* cited by examiner

SYSTEM, APPARATUS AND METHOD FOR SECURE COORDINATION OF A RENDEZVOUS POINT FOR DISTRIBUTED DEVICES USING ENTROPY MULTIPLEXING

CROSS-REFERENCE TO RELATED APPLICATION

This application claims priority to U.S. Provisional Patent Application No. 62/172,896 filed on Jun. 9, 2015 and entitled "SYSTEM, APPARATUS AND METHOD FOR SECURE COORDINATION OF A RENDEZVOUS POINT FOR DISTRIBUTED DEVICES USING ENTROPY MULTIPLEXING", the content of which is hereby incorporated by reference.

BACKGROUND

Internet of Things (IoT) networks often span multiple physical locations such as a person's home residence, vacation home, automobile, close friend's residence, and/or a vacation spot. Though the locations differ, logically the IoT network is a single network even though it has components or network segments physically remote from one another. In order to establish a virtual logical network that connects multiple physical locations, the Internet may be used as a network that unifies the physically disparate networks. Various Internet messaging technologies can be used to establish a rendezvous point in which devices in the respective disparate physical networks may discover the presence of each other as a first step to exchange keys with one another and more generally establishing a message exchange that unites the disparate networks.

However, interlopers and observers may monitor rendezvous points to obtain connection metadata to build a profile of activity involving the user and devices in a logical network, including user or users exchanging information, which devices are communicating with each other, and even details about the specific device types, their configurations, and the types of functions being performed by the devices. Security can be compromised by disclosure of such connection metadata.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

DETAILED DESCRIPTION

Figure 1:
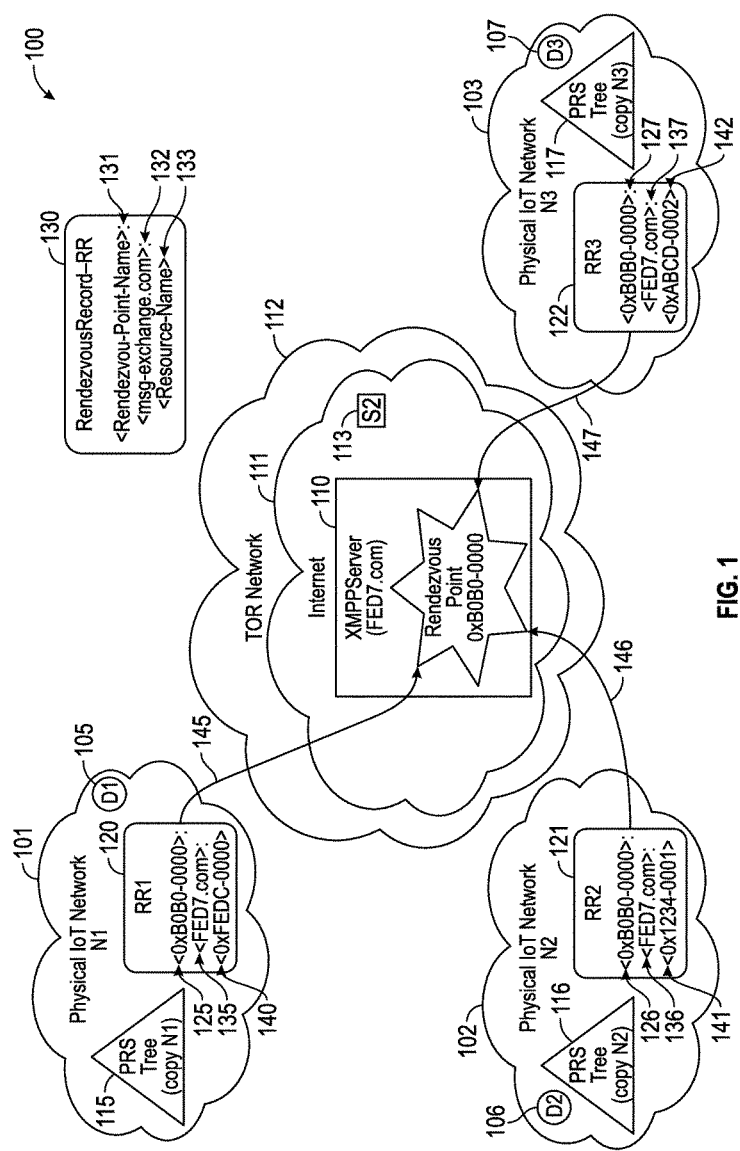
FIG. 1 is a block diagram of a system in accordance with an embodiment.

In the following description, numerous specific details are set forth but embodiments of the invention may be practiced without these specific details. Well-known circuits, structures and techniques have not been shown in detail to avoid obscuring an understanding of this description. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner.

In various embodiments, techniques are provided to combine entropy multiplexing with IoT network management to provide a rendezvous point for physically distributed IoT networks using an Internet-based service in a manner to prevent an entity monitoring the rendezvous point from obtaining a profile of activity that is specific to the user and/or the user's devices.

As used herein, a rendezvous point is, for example, in certain embodiments a logical location that two or more IoT devices can agree exists at a given time of day. The name of the location and/or the coordinate system of the location are non-descript meaning these are not explicitly known such that an observer may not predict the second location given he happens to observe the first location. Nevertheless the IoT devices authorized to participate in meeting at the intended location can do so reliably given a strategy that changes the location frequently (e.g. daily, hourly, by minute, and the like).

In an embodiment, entropy multiplexing may be used to generate a pseudo-random seed (PRS) tree that establishes a method for an agreed upon rendezvous point and a frequency/schedule for switching to a different rendezvous point. The PRS tree uses a random seed generator. Such a generator may be included in a processor (e.g., Intel® processor having an Intel® Digital Random Number Generator (DRNG)). The generator may generate a root seed.

In an embodiment, the root seed is associated with a unit of time such as particular year. The seed may be used by one or more pseudo random number generators (PRNGs) that produce the same random output, given the same seed, so the same PRS tree may be derived independently given the same root seed known by all participants. The root seed may be shared at device onboarding when an onboarding tool or server is able to securely provision the root seed directly. In other cases, the seed may be shared over a secure protocol such as when an attestation key is used to establish a secure session between one of the existing devices that has the root seed already and a device in a physically distinct network that does not yet have the seed.

Another embodiment includes a threshold secret sharing method used by a device to obtain a threshold of shares needed to reconstruct the root seed. For example, a device may have only a share of the root seed. There may be a threshold number of shares needed to be possessed by the device in order for the device to generate the actual root seed. If the device determines it does not yet have the requisite number of shares needed to construct the root seed, the device may contact other devices in other network segments (using, for example, Diffie Hellman based symmetric keys) to exchange shares. Then, once the requisite number of shares is possessed then those shares may be used to construct the root seed. In an embodiment, this occurs by using a secret sharing protocol such as Shamir Secret Sharing.

Once the root seed is acquired (e.g., by transfer to the device or by the device constructing the root seed), the root seed is used to derive the seed tree, where a schedule is used to determine the granularity of time in which rendezvous point names are to be changed (e.g., once a day, once an hour, etc.). The random number resulting at the level in the tree corresponding to the agreed upon granularity determines which random number to use as the rendezvous point name. A rendezvous point name is similar to an address indicating to devices where on an exchange server the devices can communicatively couple to each other. Considering the rendezvous point name may be a random number, this adds to the anonymity of the embodiment.

Additionally, a rendezvous point record may be formed. The rendezvous point record includes, in addition to the rendezvous point name, a resource qualifier (sometimes referred to herein as a "resource name") that may be used to specify which branch of the disparate IoT network is requesting or responding to messages exchanged over the rendezvous point. In an embodiment, a first-come-first-served strategy may be used for enumerating the participating physical networks. As will be addressed more below with regard to FIG. 2 and as addressed immediately above, a branch of the PRS tree may be used to generate random numbers corresponding to names (resource names) of the physical disparate networks. The resource names are changed along with the rendezvous point name (based on timing for the tree such as once per day) so that an observer is unable to correlate resource names with other related resources or with related rendezvous point names.

Regarding a resource qualifier or resource name, there are many things that qualify as a "resource" including a network domain name, device name, and/or database table name. Any of these may provide enough context to allow binding of an IoT message to a routing table that is useful in delivering the message.

A further embodiment relies upon a federation of Extensible Messaging and Presence Protocol (XMPP) or other message exchange service providers, where the name of the exchange servers may reveal information about the users of the exchange. Normally, the rendezvous point includes the exchange service name. Embodiments, however, may obfuscate which IoT device uses which exchange by routing exchange service requests through an anonymizing network, such as The Onion Routing (TOR). Though the rendezvous point record names the exchange service, the TOR network prevents that record from being used to track the device originating the request. An anonymizing network uses an encrypted internet protocol (IP) address for the exchange server.

Regarding the exchange servers and exchange services, in an embodiment "server" refers to an IoT device (sensor/actuator) whereas "service" refers to a management console or key management provider. A "client" may also refer to a "service" or an IoT device that is controlling a "server". Thus, a server may refer to an IoT sensor/actuator, a client may refer to an IoT Controller, and a service may refer to a provider (management, security). From the server's perspective a service may control the server and may appear to be a "client". Similarly, the server may originate requests to a service proactively in which case the service takes on a "server" role and the server takes on a "client" role. Thus, sometimes herein a reference to an "XMPP server" is logically a reference to a "service".

In another embodiment, privacy of message exchange operators may be protected while still allowing them to receive message traffic by allowing exchange operators to randomly assign IPv6 addresses to their server. A second XMPP server (or other such server) discloses the list of exchange service providers (i.e., exchange servers) available for processing messages. The requestor randomly selects from a list of servers on the second XMPP server to construct a rendezvous point record having a rendezvous point name directed towards the selected exchange server.

Thus, as described above, embodiments may be used to facilitate connecting a physically distributed IoT or social network that logically is the same network. In this network, an observer within the message server hosting the rendezvous point cannot gain significant knowledge about the logical network (other than that a logical network exists for a period of time). An observer of the Internet cannot build a connection graph of disparate networks and devices by observing traffic patterns that may correlate a particular messaging service provider with a particular set of requesting devices. Hence, the Internet may be a safe environment from which to host XMPP or similar messaging services that connect IoT and other disparate networks.

Embodiments may further leverage an end-to-end data encryption protocol or message encryption standard such as DTLS or JSON Web Encryption (JWE) such that message contents exchanged over a XMPP or similar infrastructure are not able to be decoded obtaining decryption keys. In other words, a first device communicating with a second device across the exchange server may do so without the exchange server having a key to decrypt the exchanged message.

Embodiments allow the use of a publish-and-subscribe or message exchange infrastructure to be hosted within the Internet, but where an observer with complete access to the message exchange infrastructure cannot construct a profile or connection graph that reveals privacy sensitive information about the user or devices within the user's network(s). This privacy is realized in part by providing a schedule for changing the randomly named rendezvous point name and resource names using an entropy multiplexing technique whose schedule is determined a priori at a time convenient for the user and safe from observation.

Referring now to FIG. 1, shown is a block diagram of a system 100 in accordance with an embodiment. The system includes several network segments 101, 102, 103, each forming a single logical network having one or more IoT devices 105, 106, 107. An XMPP or similar message exchange service 110 is hosted in the Internet 111 where its observation by untrusted entities may be possible. However, the XMPP service provider agrees to assign a random IPv6 address and uses a TOR network 112 to hide its true network location. A second XMPP server 113 publishes a list of XMPP servers (which includes server 110) agreeing to process message traffic. Each physical network segment 101, 102, 103 uses a PRS tree 115, 116, 117 (that is derived using a shared root seed common to each segment 101, 102, 103) such that each copy of the tree is the same, but does not require network message exchanges to coordinate sharing.

In an embodiment, rendezvous records 120, 121, 122 are generated by each segment device. A model record 130 includes a rendezvous point name 131, selected exchange server 132, and resource name 133 for the segment. Rendezvous point names 125, 126, 127 are random values with the same value at each segment. The XMPP service used to exchange the messages may be commonly agreed upon (which is why each record 120, 121, 122 has selected the $7^{th}$ server, addressed as "FED7.com" 135, 136, 137) by using the rendezvous point names 125, 126, 127 to index into the second XMP server's 113 list of available XMPP servers (e.g., RPN mod (num XMPP servers)). The PRS trees 115, 116, 117 further contain a PRN value used to generate random numbers to be assigned to each network segment to constitute resource names 140, 141, 142 (where the random numbers in the different segments differ from each other). In an embodiment, each segment receives a segment enumeration when the device is onboarded and assigned to a segment. These components are used to construct rendezvous records 120, 121, 122 that may be supplied 145, 146, 147 to XMPP server 110 to facilitate message exchange between the network segments.

Figure 2:
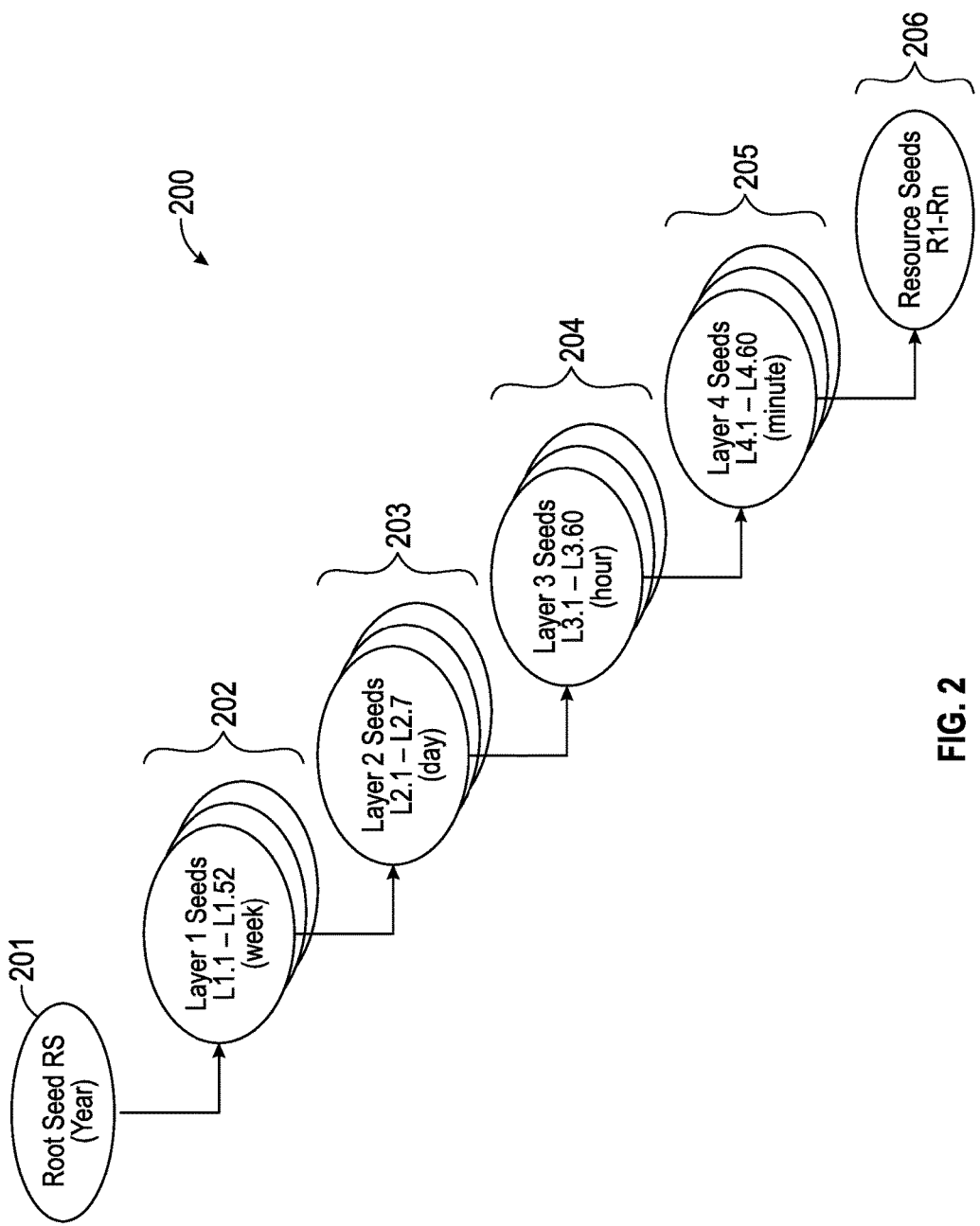
FIG. 2 is an illustration of a representative pseudo-random seed (PRS) tree in accordance with an embodiment.

Referring now to FIG. 2, shown is an illustration of a representative pseudo-random seed (PRS) tree in accordance with an embodiment. This PRS tree 200 is used to generate random values that correspond to the time quanta in which messages exchanged across an Internet-hosted XMPP service may coordinate a rendezvous point that does not disclose connection metadata or other context information. As mentioned above, the network segment devices 105, 106, 107 rely on the root seed (and the tree derived therefrom) to generate a network segment identifier (i.e., resource name) corresponding to a segment identity previously assigned. Each segment knows its own segment identity, and thus can use that value to select the correct random number to be included in the rendezvous record resource value. Resource values may be used by network segments to detect the presence of the other segments and therefore, availability for device-device interactions.

The PRNG tree architecture may be used as the basis of a PRN-generation algorithm such that a device is provided with the ability to perform a transaction based on a rendezvous point name for only a certain time quantum. Tree 200 depicts an architecture that is arranged in a seed encoding tree structure having a series of levels or layers 201, 202, 203, 204, 205, 206 that each have one or more PRNGs. Note that in other cases, a single PRNG can be used to generate seeds and then be re-seeded to generate further seeds and portions of a different tree structures. As illustrated, the PRNG tree structure is such that a random number seed generated for a given level is operative to seed one or more random number sequences at levels below the given level. This may result in generation of multiple parallel random number sequences populated as the random number generation extends to lower levels in which each given random number of a random number sequence received from a higher level may feed a separate PRNG at a level below. Each separate PRNG, in turn, may generate a new random number sequence in which each random number feeds a corresponding PRNG on a lower level.

Layer 201 addresses a "week" layer that includes seeds L1.1-L1.52 indicating the 52 weeks in year. Other layers continue the theme with, for example, layer 205 including 60 seeds for the sixty minutes of an hour. This continues to the "leaf" layer 206 that has resource seeds. Resource seeds R1-Rn are random numbers that correspond to semantic descriptions of a device in the IoT. However, by using the resource seed as a resource name no interloper will know that the random number is actually representative of a smart thermostat or light switch, for example.

Figure 3:
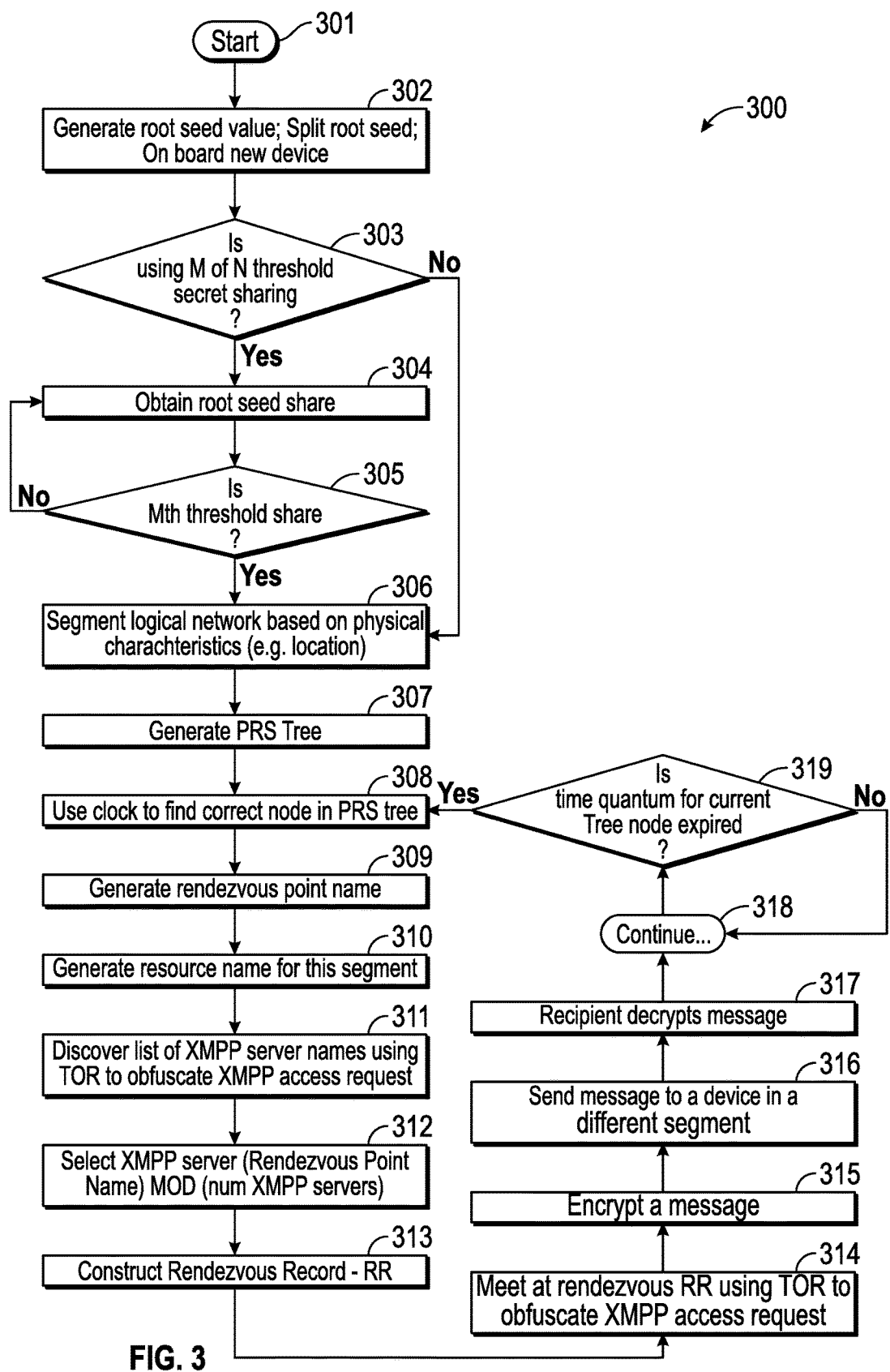
FIG. 3 is a flow diagram of a method for rendezvous record construction in accordance with an embodiment.

Referring now to FIG. 3, shown is a flow diagram of a method 300 for rendezvous record construction in accordance with an embodiment. As shown in FIG. 3, the flow diagram shows steps involved in setting the PRS tree and subsequent generation of a rendezvous record having a random rendezvous point name, random resource name and randomized/obfuscated XMPP server IP address. Yet each network segment is able to exchange messages with the other segments reliably.

Specifically, the process starts (block 301) and then one node in the system generates a root seed value (block 302). That same node may then split the root seed into shares that are then onboarded onto devices as the devices are introduced to the domain 100. Block 303 then changes perspective to that of a device, such as device 105, attempting to communicate with another device, such as device 107. Block 303 determines if root seed sharing is occurring. If not, the process proceeds directly to block 306 assuming the device has the root seed. Otherwise, in block 304 a share is obtained (from secure memory of the device or from another device) so a determination can be made (block 305) regarding whether enough shares are present to generate a root seed. If not, the subsequent shares are obtained (e.g., from other devices). If enough shares are obtained then the root seed is generated. In block 306 network segments (e.g., segments 101, 102, 103) are determined. The tree is then generated from the rood seed (block 307).

In block 308 a clock for the device is consulted to determine which of the many, many random numbers from the tree should be chosen. According to a predetermined schedule, a certain minute (random number) from layer 205 or a certain week (another random number) from layer 202 may be chosen. From that number, directly or indirectly, a rendezvous point name is determined (block 309). From a different number, also from the tree and also based on the clock's time, a resource name is determined directly or indirectly from the different number (block 310). As addressed above, a list of exchange servers is then located on a server (e.g., server 113) using a TOR network (block 311). From that list, and based on the rendezvous point name, an exchange server is determined (block 312).

A rendezvous record is then determined (block 313) and used to negotiate a key exchange supplying information to be used in, for example, a Kerberos ticket (block 314). However, instead of typically supplying semantic information from which a connectivity chart could be formed, the identifying information is obfuscated such that the rendezvous point name and resource name cannot be linked back to the device. In block 315 messages may then be encrypted (using end-to-end security such as symmetric keys negotiated between two devices in block 314) and communicated between devices (block 316). The message may be decrypted by the recipient device (block 317). The session may continue (block 318) using the same rendezvous point name and resource name if the temporal limits for the rendezvous point name and resource name have not expired (block 319). If, however, the temporal limits for the rendezvous point name and resource name have expired the process moves to block 308.

In some embodiments, a specific technology such as XMPP may supply extensibility features that support expanded functions for enhanced message exchange using publish-and-subscribe, request-response and so forth. When these enhancements are invoked, embodiments may apply a similar approach to randomize, for example, a topic name that may be used by multiple publishers or subscribers or requestors and responders to agree upon a context for interaction. The method to generate a randomized topic name follows the method used to arrive at a randomized rendezvous point name, which may be implemented using the Pub/Sub XMPP extension (XEP-0060), in an embodiment. The rendezvous point can be constructed using the node name. The node name follows the permissive set of characters in XML, and a randomly generated node name can be constructed with n=base64(node-name), where node-name is the binary representation name generated by the PRNG.

Publishers and subscribers can subsequently publish and consume items from the pub/sub node, e.g., using the MUC (Multi User Chat) extension (XEP-0045). The rendezvous point is effectively the room-id or the first ID portion of the bare JID (ID@realm/resource). The construction of the ID follows the same rules as a pub/sub node name.

In regards to Service Discovery #discoitems in XMPP, this mechanism allows people to enumerate or discover services (MUC and pub/sub nodes). An embodiment of the invention may obfuscate discoverable topics using a similarly randomized attribute set where the mapping of attribute values is made to an entropy multiplexed tree and similarly tied to the time-base EM tree. Hence, each attribute name can be encoded as a random value that changes periodically but where each participant having the root seed is able to simultaneously decode the encoding.

Embodiments thus provide a PRS tree to generate random values that may be used to construct a rendezvous record containing no privacy sensitive connection metadata. In addition, a TOR network can be used to obfuscate the selection of an Internet-hosted message exchange server and/or to obfuscate rendezvous point instantiation on an Internet-hosted message exchange server. Embodiments also may use a DRNG or other PRNG to generate a PRS tree by distributed IoT network segments forming a logical IoT network. As such, an M of N secret sharing method may be used to partition a root PRS seed used to further construct a PRS tree.

Using embodiments, privacy of a message exchange service in the Internet may be ensured so that connection metadata and message data cannot be harvested and analyzed for connection graph construction or other privacy sensitive purpose.

Figure 4:
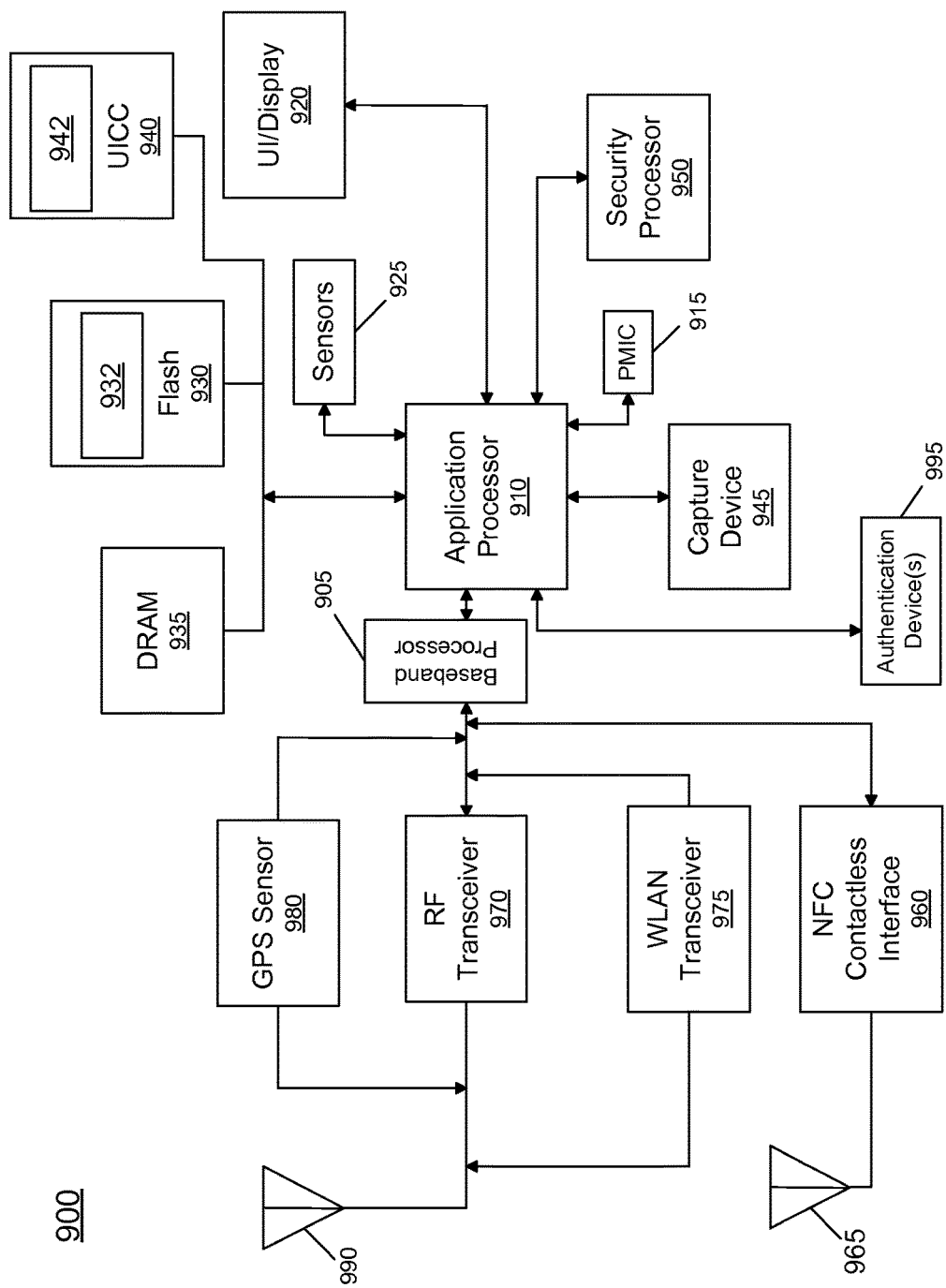
FIG. 4 is a block diagram of an example system with which embodiments can be used.

Referring now to FIG. 4, shown is a block diagram of an example system with which embodiments (e.g., device 105 or server 110) can be used. As seen, system 900 may be a smartphone or other wireless communicator or any other IoT device. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which secrets and other sensitive information may be stored. As further seen, application processor 910 also couples to a capture device 945 such as one or more image capture devices that can record video and/or still images.

Still referring to FIG. 4, a universal integrated circuit card (UICC) 940 comprises a subscriber identity module, which in some embodiments includes a secure storage 942 to store secure user information. System 900 may further include a security processor 950 that may couple to application processor 910. A plurality of sensors 925, including one or more multi-axis accelerometers may couple to application processor 910 to enable input of a variety of sensed information such as motion and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 4, understand that in some implementations one antenna or a different set of antennae may be provided to enable various wireless functionalities.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received such as in one or more IoT networks, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein when context information is to be used in a pairing process. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 5:
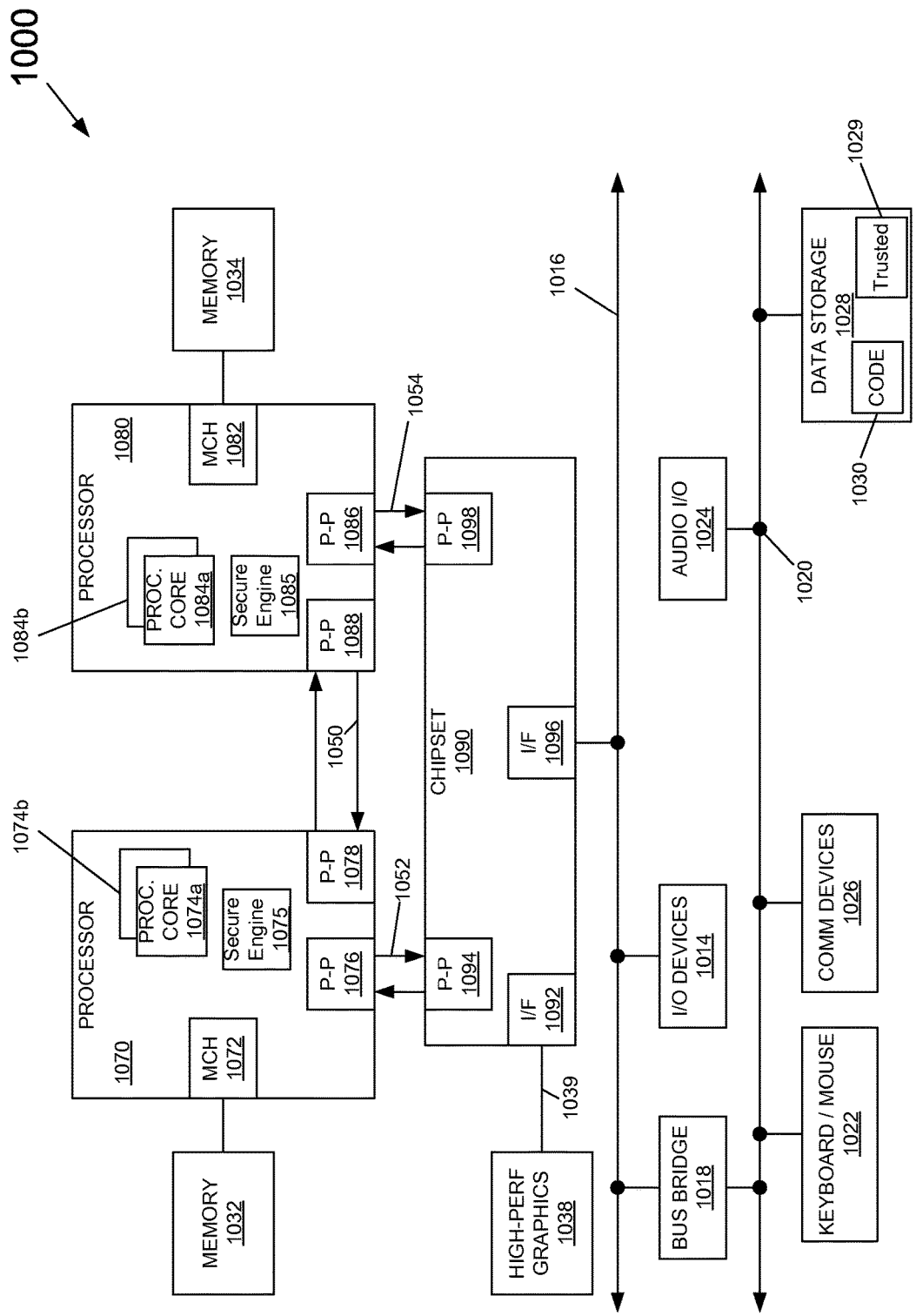
FIG. 5 is a block diagram of a system in accordance with another embodiment of the present invention.

Referring now to FIG. 5, shown is a block diagram of a system (e.g., device 105 or server 110) in accordance with another embodiment of the present invention. As shown in FIG. 5, multiprocessor system 1000 is a point-to-point interconnect system such as a server system, and includes a first processor 1070 and a second processor 1080 coupled via a point-to-point interconnect 1050. As shown in FIG. 5, each of processors 1070 and 1080 may be multicore processors such as SoCs, including first and second processor cores (i.e., processor cores 1074a and 1074b and processor cores 1084a and 1084b), although potentially many more cores may be present in the processors. In addition, processors 1070 and 1080 each may include a secure engine 1075 and 1085 to perform security operations such as attestations, IoT network onboarding or so forth.

Still referring to FIG. 5, first processor 1070 further includes a memory controller hub (MCH) 1072 and point-to-point (P-P) interfaces 1076 and 1078. Similarly, second processor 1080 includes a MCH 1082 and P-P interfaces 1086 and 1088. As shown in FIG. 5, MCH's 1072 and 1082 couple the processors to respective memories, namely a memory 1032 and a memory 1034, which may be portions of main memory (e.g., a DRAM) locally attached to the respective processors. First processor 1070 and second processor 1080 may be coupled to a chipset 1090 via P-P interconnects 1052 and 1054, respectively. As shown in FIG. 5, chipset 1090 includes P-P interfaces 1094 and 1098.

Furthermore, chipset 1090 includes an interface 1092 to couple chipset 1090 with a high performance graphics engine 1038, by a P-P interconnect 1039. In turn, chipset 1090 may be coupled to a first bus 1016 via an interface 1096. As shown in FIG. 5, various input/output (I/O) devices 1014 may be coupled to first bus 1016, along with a bus bridge 1018 which couples first bus 1016 to a second bus 1020. Various devices may be coupled to second bus 1020 including, for example, a keyboard/mouse 1022, communication devices 1026 and a data storage unit 1028 such as a non-volatile storage or other mass storage device. As seen, data storage unit 1028 may include code 1030, in one embodiment. As further seen, data storage unit 1028 also includes a trusted storage 1029 to store sensitive information to be protected. Further, an audio I/O 1024 may be coupled to second bus 1020.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

The following examples pertain to further embodiments.

Example 1 includes at least one computer readable storage medium comprising instructions that when executed enable a system to: generate, in a first device of a first segment of a first network, a pseudo-random seed tree from a root seed; access, in the first device at a first time, a random number at a level of the pseudo-random seed tree that corresponds to the first time; generate, in the first device, (a)(i) a rendezvous point name based on the random number, and (a)(ii) a rendezvous point record, which includes the rendezvous point name, to enable communication between the first device and a second device that is in a second segment of the first network; and send, from the first device, (b)(i) the rendezvous record to an exchange server, and (b)(ii) an encrypted message to the second device via the exchange server.

As used herein, the term "random number" may refer to a true random number or a pseudo random number depending upon context, and absent an explicit indication, may refer to either a true random number or pseudo random number.

The use of PRNGs as a source of digital entropy as provided by the present embodiments has the advantages of scalability and speed in comparison to systems based, for example, solely on true random number generators. PRNGs also provide the advantage that they produce re-creatable sequences. True random numbers do not have a seed and are produced in an unpredictable and unrepeatable fashion. True random numbers may be employed in the present embodiments to generate the first seeds/root seeds at a highest level of a category tree. However, under that level PRNGs are used to create the anonymized and recoverable numbers, which cannot be accomplished using true random numbers.

It is to be noted that the PRN in each of a sequence of PRNs (such as those in seed trees) is generated based upon a procedure or algorithm implemented by the PRNG. Each successive PRN is generated by operation of the algorithm on the previous PRN. In order for a trusted party to regenerate a given PRN in a sequence generated by the PRNG, in addition to the actual algorithm employed by the PRNG, the party may be provided with a root seed (generated from a DRNG) used to initialize the PRNG, as well as the number of steps taken to reach the given PRN from the PRNG. Thus, a PRN that is derived from a given PRN may be regenerated by any party or entity that employs a pseudo random number generator using the given algorithm and having the given PRN as input.

Note that in actuality, "generation" or "creation" of a PRN tree is not possible, as such tree is an infinitely large and expanding structure. Instead, as used herein these terms relate to generation of time-delimited branches of such trees and/or a portion of a tree structure associated with a given time bounding.

Please note devices, such as devices 105, 106, 107 as well as servers 110, 113 may utilize platforms having one or more secure environments such as the capability for a trusted execution environment (TEE), in which transactions may be processed as described herein. In an example embodiment, the TEE may be implemented using Intel® SGX technology, Intel® TXT technology, or an ARM TrustZone, among others. To this end, processors and/or other hardware within such platforms may provide trusted hardware to perform trust assertions, random number generation and other security measures appropriate for given transactions. For example, seed tree generation and rendezvous point names may be generated within a TEE.

In example 1 addresses accessing a random number at a level of the pseudo-random seed tree that corresponds (directly or indirectly) to the first time and generating a rendezvous point name based on the random number. Thus, the rendezvous point name may be the number from the tree or may be derived (e.g., rendezvous point name=base64 (number from tree).

In example 2 the subject matter of the Example 1 can optionally include the at least one computer readable storage medium further comprising instructions that when executed enable the system to identify the exchange server based on the rendezvous point name.

In example 3 the subject matter of the Examples 1-2 can optionally include the at least one computer readable storage medium of claim 3, further comprising instructions that when executed enable the system to determine the first time based on a predetermined schedule accessible to the first device before the first device accesses the random number.

In example 4 the subject matter of the Examples 1-3 can optionally include the at least one computer readable storage medium, wherein the rendezvous point record includes connection metadata corresponding to the first device and the exchange server.

In example 5 the subject matter of the Examples 1-4 can optionally include the at least one computer readable storage medium, wherein the connection metadata does not reveal an identity of the first device, an identity of the first segment, or a network location of the exchange server where the first and second segments rendezvous.

In example 6 the subject matter of the Examples 1-5 can optionally include the at least one computer readable storage medium, wherein the rendezvous point record does not include connection metadata specific to the first device.

In example 7 the subject matter of the Examples 1-6 can optionally include the at least one computer readable storage medium further comprising instructions that when executed enable the system to: send the encrypted message to the second device via the exchange server, which is located on the internet; wherein the first and second segments are physically located remote from one another.

In example 8 the subject matter of the Examples 1-7 can optionally include the at least one computer readable storage medium further comprising instructions that when executed enable the system to: generate, in the first device, a resource name that is based on a value determined from the pseudo-random seed tree and that corresponds to the first segment; and include the resource name in the rendezvous point record; wherein the rendezvous point name includes a random value and the resource name includes another random value.

In example 9 the subject matter of the Examples 1-8 can optionally include the at least one computer readable storage medium further comprising instructions that when executed enable the system to: after sending the rendezvous record to the exchange server, determine whether time for the rendezvous point record has expired; and when the time for the rendezvous point record has expired, generate, in the first device, (a)(i) an additional rendezvous point name based on an additional random number, and (a)(ii) an additional rendezvous point record, which includes the additional rendezvous point name, to enable communication between the first and second devices.

In example 10 the subject matter of the Examples 1-9 can optionally include the at least one computer readable storage medium further comprising instructions that when executed enable the system to: when the time for the rendezvous point record has expired, generate, in the first device, (a)(i) an additional resource name based on an additional value determined from the pseudo-random seed tree and that corresponds to the first segment, and (a)(ii) the additional rendezvous point record, which includes the additional resource name, to enable communication between the first and second devices.

In example 11 the subject matter of the Examples 1-10 can optionally include the at least one computer readable storage medium further comprising instructions that when executed enable the system to: obtain, in the first device, first and second shares of the root seed; determine whether the first and second shares satisfy a threshold; and in response to determining the first and second shares satisfy the threshold, generate the root seed in the first device.

In example 12 the subject matter of the Examples 1-11 can optionally include the at least one computer readable storage medium further comprising instructions that when executed enable the system to: access a second exchange server based on the rendezvous point name; and selecting the exchange server based on accessing the second exchange server.

In example 13 the subject matter of the Examples 1-12 can optionally include the at least one computer readable storage medium further comprising instructions that when executed enable the system to communicatively couple the first and second devices via the exchange server based on the rendezvous record and a rendezvous record of the second device each including equivalent rendezvous point names comprising equivalent random values.

In example 14 the subject matter of the Examples 1-13 can optionally include the at least one computer readable storage medium further comprising instructions that when executed enable the system to send, using an encrypted internet protocol (IP) address for the exchange server, (b)(i) the rendezvous record to the exchange server, and (b)(ii) the encrypted message to the second device.

In example 15 the subject matter of the Examples 1-14 can optionally include the at least one computer readable storage medium further comprising instructions that when executed enable the system to encrypt a message, to form the encrypted message, based on a key corresponding to a key of the second device, to provide end-to-end protection for encrypted message between the first and second devices such that encrypted message is not visible to the exchange server.

In example 16 the subject matter of the Examples 1-15 can optionally include the at least one computer readable storage medium further comprising instructions that when executed enable the system to discover the second device, with the first device, based on a resource name for the second device.

In example 17 the subject matter of the Examples 1-16 can optionally include the at least one computer readable storage medium further comprising instructions that when executed enable the system to: generate a topic, in the first device, based on a value determined from the pseudo-random seed tree; and publish, with the first device, the topic to the exchange server in a publish-subscribe messaging protocol.

Example 18 includes a system comprising: a first device, of a first segment of a first network, including at least one first memory and at least one first processor coupled to the at least one first memory; and a second device, of a second segment of a second network, including at least one second memory and at least one second processor coupled to the at least one second memory; the at least one first and second processors to perform operations comprising: generating (a)(i) in the first device a pseudo-random seed tree from a root seed, and (a)(ii) in the second device an additional instance of the pseudo-random seed tree from an additional instance of the root seed; accessing (b)(i) in the first device at a first time period a random number of the pseudo-random seed tree that corresponds to the first time, and (b)(ii) in the second device at the first time period the random number of the additional instance of the pseudo-random seed tree that corresponds to the first time period; generating, in the first device, (c)(i) a rendezvous point name based on the random number, and (c)(ii) a rendezvous point record that includes the rendezvous point name; generating, in the second device, (d)(i) the rendezvous point name based on the random number, and (d)(ii) an additional rendezvous point record that includes the rendezvous point name; sending, from the first device, (e)(i) the rendezvous record to an exchange server, and (e)(ii) an encrypted message to the second device via the exchange server; and sending, from the second device, the additional rendezvous record to the exchange server and, based on the rendezvous record and the additional rendezvous record, receiving the encrypted message at the second device via the exchange server.

Thus, accessing (b)(i) in the first device at a first time period a random number and (b)(ii) in the second device at the first time period the random number of the additional instance of the pseudo-random seed tree allows for the first and second devices to not be forced into simultaneous accessing of the numbers so long as they are accessed within the first time period (e.g., minute, hour, day).

Another version of example 18 includes a system comprising: a first device including at least one first memory and at least one first processor coupled to the at least one first memory; and a second device including at least one second memory and at least one second processor coupled to the at least one second memory; the at least one first and second processors to perform operations comprising: generating, when the first device is included a first segment of a first network and the second device is included a second segment of the first network, (a)(i) in the first device a pseudo-random seed tree from a root seed, and (a)(ii) in the second device an additional instance of the pseudo-random seed tree from an additional instance of the root seed; accessing (b)(i) in the first device at a first time period a random number of the pseudo-random seed tree that corresponds to the first time, and (b)(ii) in the second device at the first time period the random number of the additional instance of the pseudo-random seed tree that corresponds to the first time period; generating, in the first device, (c)(i) a rendezvous point name based on the random number, and (c)(ii) a rendezvous point record that includes the rendezvous point name; generating, in the second device, (d)(i) the rendezvous point name based on the random number, and (d)(ii) an additional rendezvous point record that includes the rendezvous point name; sending, from the first device, (e)(i) the rendezvous record to an exchange server, and (e)(ii) an encrypted message to the second device via the exchange server; and sending, from the second device, the additional rendezvous record to the exchange server and, based on the rendezvous record and the additional rendezvous record, receiving the encrypted message at the second device via the exchange server.

In example 19 the subject matter of Example 18 can optionally include wherein the operations comprise each of the first and second devices selecting the exchange server based on the rendezvous point name.

In example 20 the subject matter of the Examples 18-19 can optionally include wherein the operations comprise each of the first and second devices determining the first time period based on a predetermined schedule accessible to the first and second devices before the first device accesses the random number.

In example 21 the subject matter of the Examples 18-20 can optionally include wherein the operations comprise: in the first device, (a)(i) generating a resource name that is based on a value determined from the pseudo-random seed tree and that corresponds to the first segment; and (a)(ii) including the resource name in the rendezvous point record; and in the second device, (b)(i) generating an additional resource name that is based on an additional value determined from the pseudo-random seed tree and that corresponds to the second segment; and (b)(ii) including the additional resource name in the additional rendezvous point record; wherein the rendezvous point name includes a random value and the resource name includes another random value.

In example 22 the subject matter of the Examples 18-21 can optionally include wherein the operations comprise: after sending the rendezvous record to the exchange server, the first device determining whether time for the rendezvous point record has expired; after sending the additional rendezvous record to the exchange server, the second device determining whether time for the rendezvous point record has expired; and when the time for the rendezvous point record has expired, generate, in the first and second devices another plurality of rendezvous point records, which include another plurality of rendezvous point names.

In example 23 the subject matter of the Examples 18-22 can optionally include wherein the operations comprise communicatively coupling the first and second devices via the exchange server based on the rendezvous record and the additional rendezvous record each including equivalent rendezvous point names comprising equivalent random values.

Example 24 includes an apparatus comprising: a first device, of a first segment of a first network, including at least one first memory and at least one first processor coupled to the at least one first memory, the at least one first processor to perform operations comprising: determining a pseudo-random seed tree from a root seed; accessing at a first time a random value at a level of the pseudo-random seed tree that corresponds to the first time; determining in the first device, (a)(i) a rendezvous point name based on the random value, and (a)(ii) a rendezvous point record, which includes the rendezvous point name, to enable communication between the first device and a second device that is in a second segment of the first network; and communicating (b)(i) the rendezvous record to an exchange server, and (b)(ii) an encrypted message to the second device via the exchange server.

In determining a seed tree, the first device may generate the tree, retrieve it from storage, or otherwise access the tree.

Another version of Example 24 includes an apparatus comprising: a first device including at least one first memory and at least one first processor coupled to the at least one first memory, the at least one first processor to perform operations comprising: determining a pseudo-random seed tree from a root seed; when the first device is included in a first segment of a first network, accessing at a first time a random value at a level of the pseudo-random seed tree that corresponds to the first time; determining in the first device, (a)(i) a rendezvous point name based on the random value, and (a)(ii) a rendezvous point record, which includes the rendezvous point name, to enable communication between the first device and a second device that is in a second segment of the first network; and communicating (b)(i) the rendezvous record to an exchange server, and (b)(ii) an encrypted message to the second device via the exchange server.

In example 25 the subject matter of Example 24 can optionally include wherein the operations comprise selecting the exchange server based on the rendezvous point name.

An example includes at least one computer readable storage medium comprising instructions that when executed enable a system to: receive, in a first device of a first segment of a first network, a root seed from a second device; generate a pseudo-random seed tree using the root seed; according to a predetermined schedule, access at a first time a random number at a level of the pseudo-random seed tree associated with the first time; generate a rendezvous point record to enable communication with a third device in a second segment of the first network, the rendezvous point record including a rendezvous point name based on the random number; and encrypt and send a message to the third device via an exchange server identified using the rendezvous point record, wherein the rendezvous point record does not include connection metadata, the exchange server having an anonymous network location.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. At least one non-transitory computer readable storage medium comprising instructions that when executed cause a system to:
generate, in a first device of a first segment of a first network, a pseudo-random seed tree from a root seed;
access, in the first device at a first time, a random number at a level of the pseudo-random seed tree that corresponds to the first time;
generate, in the first device, (a)(i) a rendezvous point name based on the random number, and (a)(ii) a rendezvous point record, which includes the rendezvous point name, to cause communication between the first device and a second device that is in a second segment of the first network; and
send, from the first device, (b)(i) the rendezvous point record to an exchange server, and (b)(ii) an encrypted message to the second device via the exchange server communicatively coupling the first and second devices via the exchange server.

2. The at least one computer readable storage medium of claim 1, further comprising instructions that when executed cause the system to identify the exchange server based on the rendezvous point name.

3. The at least one computer readable storage medium of claim 1, further comprising instructions that when executed cause the system to determine the first time based on a predetermined schedule accessible to the first device before the first device accesses the random number.

4. The at least one computer readable storage medium of claim 3, wherein the rendezvous point record includes connection metadata corresponding to the first device and the exchange server.

5. The at least one computer readable storage medium of claim 4, wherein the connection metadata does not reveal an identity of the first device, an identity of the first segment, or a network location of the exchange server where the first and second segments communicatively couple at a rendezvous point corresponding to the rendezvous point name.

6. The at least one computer readable storage medium of claim 4, wherein the rendezvous point record does not include connection metadata specific to the first device.

7. The at least one computer readable storage medium of claim 1, further comprising instructions that when executed cause the system to:
send the encrypted message to the second device via the exchange server, which is located on the internet;
wherein the first and second segments are physically located remote from one another.

8. The at least one computer readable storage medium of claim 1, further comprising instructions that when executed cause the system to:
generate, in the first device, a resource name that is based on a value determined from the pseudo-random seed tree and that corresponds to the first segment; and
include the resource name in the rendezvous point record;
wherein the rendezvous point name includes a random value and the resource name includes another random value.

9. The at least one computer readable storage medium of claim 1, further comprising instructions that when executed cause the system to:
after sending the rendezvous point record to the exchange server, determine whether time for the rendezvous point record has expired; and
when the time for the rendezvous point record has expired, generate, in the first device, (a)(i) an additional rendezvous point name based on an additional random number, and (a)(ii) an additional rendezvous point record, which includes the additional rendezvous point name, to cause communication between the first and second devices.

10. The at least one computer readable storage medium of claim 1, further comprising instructions that when executed cause the system to:
when the time for the rendezvous point record has expired, generate, in the first device, (a)(i) an additional resource name based on an additional value determined from the pseudo-random seed tree and that corresponds to the first segment, and (a)(ii) the additional rendezvous point record, which includes the additional resource name, to cause communication between the first and second devices.

11. The at least one computer readable storage medium of claim 1, further comprising instructions that when executed cause the system to:
obtain, in the first device, first and second shares of the root seed;
determine whether the first and second shares satisfy a threshold; and
in response to determining the first and second shares satisfy the threshold, generate the root seed in the first device.

12. The at least one computer readable storage medium of claim 1, further comprising instructions that when executed cause the system to:
access a second exchange server based on the rendezvous point name; and
select the exchange server based on accessing the second exchange server.

13. The at least one computer readable storage medium of claim 1, further comprising instructions that when executed cause the system to communicatively couple the first and second devices via the exchange server based on the rendezvous point record and a rendezvous point record of the second device, the rendezvous point records of the first and second devices each including equivalent rendezvous point names comprising equivalent random values.

14. The at least one computer readable storage medium of claim 1, further comprising instructions that when executed cause the system to send, using an encrypted internet protocol (IP) address for the exchange server, (b)(i) the rendezvous point record to the exchange server, and (b)(ii) the encrypted message to the second device.

15. The at least one computer readable storage medium of claim 1, further comprising instructions that when executed cause the system to encrypt a message, to form the encrypted message, based on a key corresponding to a key of the second device, to provide end-to-end protection for the encrypted message between the first and second devices such that encrypted message is not visible to the exchange server.

16. The at least one computer readable storage medium of claim 1, further comprising instructions that when executed cause the system to discover the second device, with the first device, based on a resource name for the second device.

17. The at least one computer readable storage medium of claim 1, further comprising instructions that when executed cause the system to:
generate a topic, in the first device, based on a value determined from the pseudo-random seed tree; and
publish, with the first device, the topic to the exchange server in a publish-subscribe messaging protocol.

18. A system comprising:
a first device including at least one first memory and at least one first processor coupled to the at least one first memory; and
a second device including at least one second memory and at least one second processor coupled to the at least one second memory;
the at least one first and second processors to perform operations comprising:
generating, when the first device is included a first segment of a first network and the second device is included a second segment of the first network, (a)(i) in the first device a pseudo-random seed tree from a root seed, and (a)(ii) in the second device an additional instance of the pseudo-random seed tree from an additional instance of the root seed;
accessing (b)(i) in the first device at a first time period a random number of the pseudo-random seed tree that corresponds to the first time, and (b)(ii) in the second device at the first time period the random number of the additional instance of the pseudo-random seed tree that corresponds to the first time period;
generating, in the first device, (c)(i) a rendezvous point name based on the random number, and (c)(ii) a rendezvous point record that includes the rendezvous point name;
generating, in the second device, (d)(i) the rendezvous point name based on the random number, and (d)(ii) an additional rendezvous point record that includes the rendezvous point name;
sending, from the first device, (e)(i) the rendezvous point record to an exchange server, and (e)(ii) an encrypted message to the second device via the exchange server communicatively coupling the first and second devices via the exchange server; and
sending, from the second device, the additional rendezvous point record to the exchange server and, based on the rendezvous point record and the additional rendezvous point record, receiving the encrypted message at the second device via the exchange server.

19. The system of claim 18, wherein the operations comprise each of the first and second devices selecting the exchange server based on the rendezvous point name.

20. The system of claim 18, wherein the operations comprise each of the first and second devices determining the first time period based on a predetermined schedule accessible to the first and second devices before the first device accesses the random number.

21. The system of claim 18, wherein the operations comprise:
in the first device, (a)(i) generating a resource name that is based on a value determined from the pseudo-random seed tree and that corresponds to the first segment; and (a)(ii) including the resource name in the rendezvous point record; and
in the second device, (b)(i) generating an additional resource name that is based on an additional value determined from the pseudo-random seed tree and that corresponds to the second segment; and (b)(ii) including the additional resource name in the additional rendezvous point record;
wherein the rendezvous point name includes a random value and the resource name includes another random value.

22. The system of claim 18, wherein the operations comprise:
after sending the rendezvous point record to the exchange server, the first device determining whether time for the rendezvous point record has expired;
after sending the additional rendezvous point record to the exchange server, the second device determining whether time for the rendezvous point record has expired; and
when the time for the rendezvous point record has expired, generate, in the first and second devices another plurality of rendezvous point records, which include another plurality of rendezvous point names.

23. The system of claim 18, wherein the operations comprise communicatively coupling the first and second devices via the exchange server based on the rendezvous point record and the additional rendezvous point record, the rendezvous point record and the additional rendezvous point record each including equivalent rendezvous point names comprising equivalent random values.

24. An apparatus comprising:
a first device including at least one first memory and at least one first processor coupled to the at least one first memory, the at least one first processor to perform operations comprising:
determining a pseudo-random seed tree from a root seed;
when the first device is included in a first segment of a first network, accessing at a first time a random value at a level of the pseudo-random seed tree that corresponds to the first time;
determining in the first device, (a)(i) a rendezvous point name based on the random value, and (a)(ii) a rendezvous point record, which includes the rendezvous point name, to cause communication between the first device and a second device that is in a second segment of the first network; and
communicating (b)(i) the rendezvous point record to an exchange server, and (b)(ii) an encrypted message to the second device via the exchange server communicatively coupling the first and second devices via the exchange server.

25. The apparatus of claim 24, wherein the operations comprise selecting the exchange server based on the rendezvous point name.

* * * * *